H. SCHWEITER.
COP OR PIRN WINDING MACHINE.
APPLICATION FILED JUNE 6, 1916.

1,259,785.

Patented Mar. 19, 1918.

Inventor:
Hans Schweiter
Per Ferdinand Bosshardt.
Attorney.

UNITED STATES PATENT OFFICE.

HANS SCHWEITER, OF HORGEN, SWITZERLAND.

COP OR PIRN WINDING MACHINE.

1,259,785.

Specification of Letters Patent.

Patented Mar. 19, 1918.

Application filed June 6, 1916. Serial No. 101,941.

*To all whom it may concern:*

Be it known that I, HANS SCHWEITER, a citizen of Switzerland, residing at Horgen, Switzerland, have invented certain new and useful Improvements Relating to Cop or Pirn Winding Machines, of which the following is a specification.

This invention relates to an improved drive for actuating the spindle shaft of winding machines in which the winding spindle performs a rotary movement in addition to an axial movement. In winding machines of this kind the defect has shown itself that, owing to the rotary motion and to the simultaneous axial movement of the winding spindle shaft friction is set up which has a detrimental effect on the formation of the pirn or cop. Many attempts have been made to reduce this friction, but were unsatisfactory because the construction took up considerable space the saving of which plays a great part in winding machines.

The object of the said invention is to overcome these defects and lies substantially in the fact that the said spindle shaft is rotated by a sleeve coupled thereto by means of one or more antifriction balls, which partly engage in a hole or holes in the said sleeve and partly in a groove or grooves in the said spindle, in such a manner that the friction hitherto set up by the longitudinal displacement of the spindle in the sleeve is reduced to a minimum and the winding of the cop or pirn thereby greatly improved.

A construction of drive for winding machines which embodies the said invention is shown by way of example in the accompanying drawings.

Figure 1:
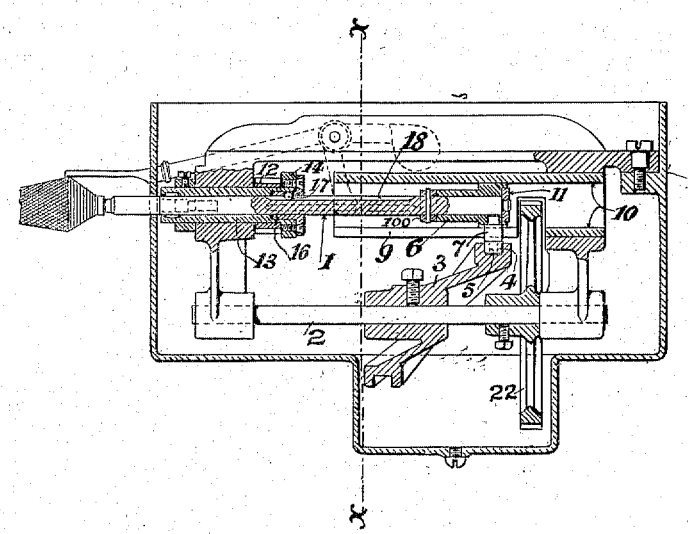
Figure 2:
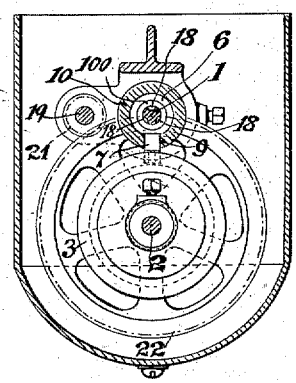
Figure 3:
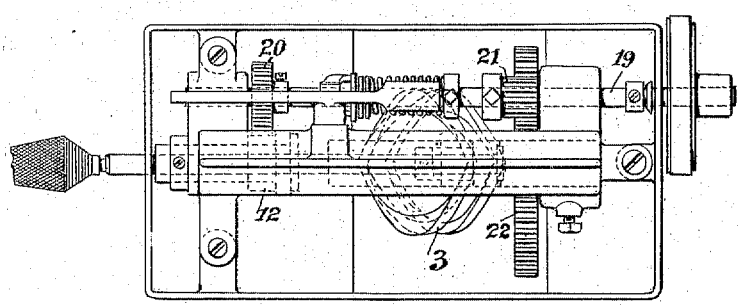

Figure 1 is a longitudinal section and Fig. 3 a plan. Fig. 2 is a section on line X—X of Fig. 1.

The spindle shaft 1 receives its axial reciprocating motion in the known manner by means of a grooved cam 3 mounted on the shaft 2. The spindle 1 carries at its rear end a sleeve 6 which is provided with a pin 5 carrying a roller 4 which engages the groove in the grooved cam 3. The connection between the spindle and sleeve is such that the spindle can rotate without hindrance during its reciprocating movement. For this purpose the spindle lies loose inside the sleeve 6 and is provided at the end with a nut 11, while at the opposite end of the sleeve 6 a stop ring 100 is secured to the spindle shaft. The rear end of the sleeve 6 has a cylindrical enlargement guided in a suitable tubular guide 10 provided at the bottom with a slot 9 to guide the enlarged portion 7 of the pin 5 so that the roller 4 can follow the path of the grooved cam without hindrance. A sleeve 13 is loosely mounted on the fore part of the spindle shaft, which sleeve is rotatable, but not slidable in relation to the frame and carries a toothed wheel 12 at one end. A box 16, similar in form to a ball-cage, is built into the other end of the sleeve 13. The flange 15 of the box 16 and the flange 14 of the sleeve 13 are secured together by screws. In the present instance this box has three radial holes which serve to retain the balls 17. The spindle shaft 1 has three longitudinal grooves 18 which serve to receive the inner half of the balls 17. When the sleeve 13 is rotated, the balls 17 will cause the spindle shaft 1 to rotate without thereby hindering the spindle shaft in its axial movement. Owing to the balls being loosely carried, they can move freely and the friction is reduced to a minimum.

It will be readily understood that the number of the balls employed is optional. For example only one ball may be employed to work in a groove in the spindle shaft and a hole in the said sleeve.

In the above described device the drive takes place from the shaft 19. This shaft carries a toothed wheel 20 engaging the toothed wheel 12 on the sleeve 13. The sleeve 13, and with it the spindle shaft, is thereby set in rotation.

The pinion 21 mounted on the shaft 19 acts on the toothed wheel 22 mounted on the shaft 2, and thereby rotates the grooved cam 3 and produces the axial movement of the spindle shaft.

I claim:

1. In a cop or pirn winding machine, a bearing, a rotary sleeve longitudinally stationary in the said bearing, a winding spindle shaft longitudinally reciprocable in the said sleeve, an antifriction ball coupling connecting the said sleeve and shaft rotarily together, a guide in alinement with the said bearing into which the rear end of the said shaft extends, a sleeve rotarily stationary on the said rear end and having a cylindrical enlargement fitting the bore of the said guide and a quick traversing cam engaging the said sleeve, for the purpose hereinbefore specified.

2. In a cop or pirn winding machine, a bearing, a rotary sleeve longitudinally stationary in the said bearing, a winding spindle shaft longitudinally reciprocable in the said sleeve, an antifriction ball coupling connecting the said sleeve and shaft rotarily together, a guide in alinement with the said bearing into which the rear end of the said shaft extends, a sleeve rotarily stationary on the said rear end having a cylindrical enlargement fitting the bore of the said guide and a quick traversing cam engaging the said sleeve, the said coupling comprising a box secured into the rear end of the said sleeve and having a plurality of radial holes, a corresponding number of longitudinal grooves in the said shaft and an antifriction ball in each of the said holes engaging in the said grooves, for the purpose hereinbefore specified.

HANS SCHWEITER.

Witnesses:
CARL DEVEREN,
OLGA M. AURIG.